Sept. 26, 1961     A. P. BEILER     3,001,635
CONVEYOR
Filed Aug. 13, 1959     3 Sheets-Sheet 1
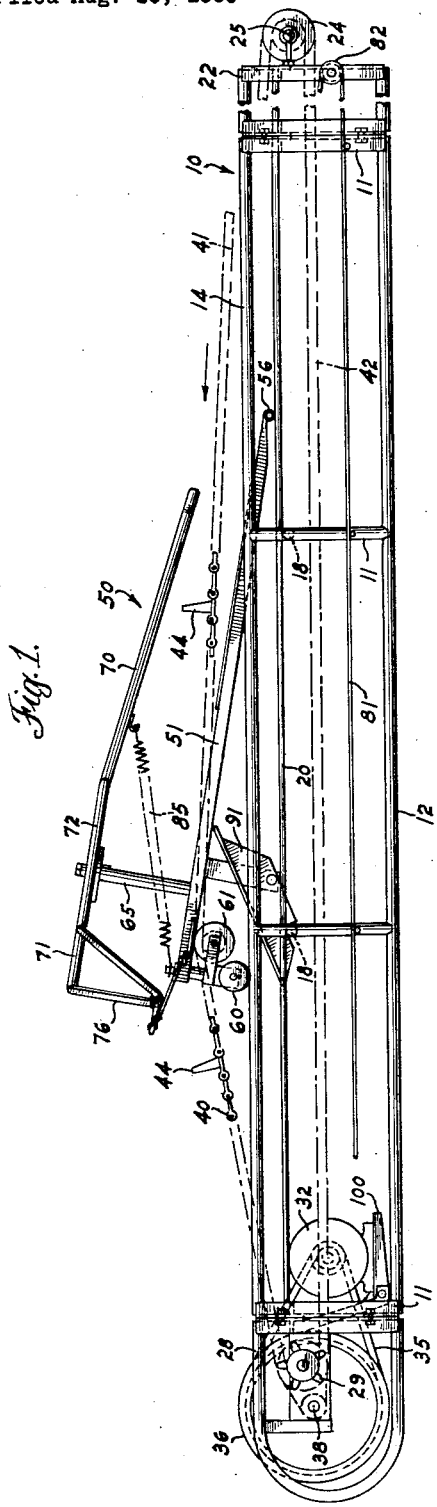
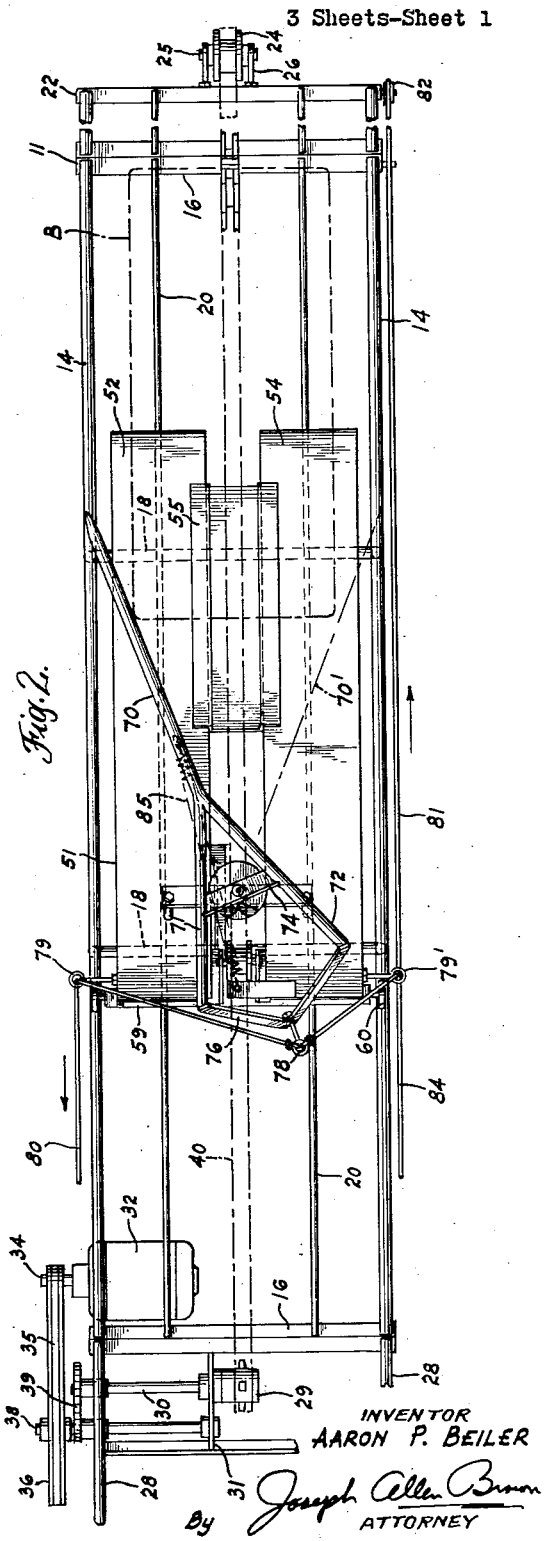
INVENTOR
AARON P. BEILER
By Joseph Allen Brown
ATTORNEY

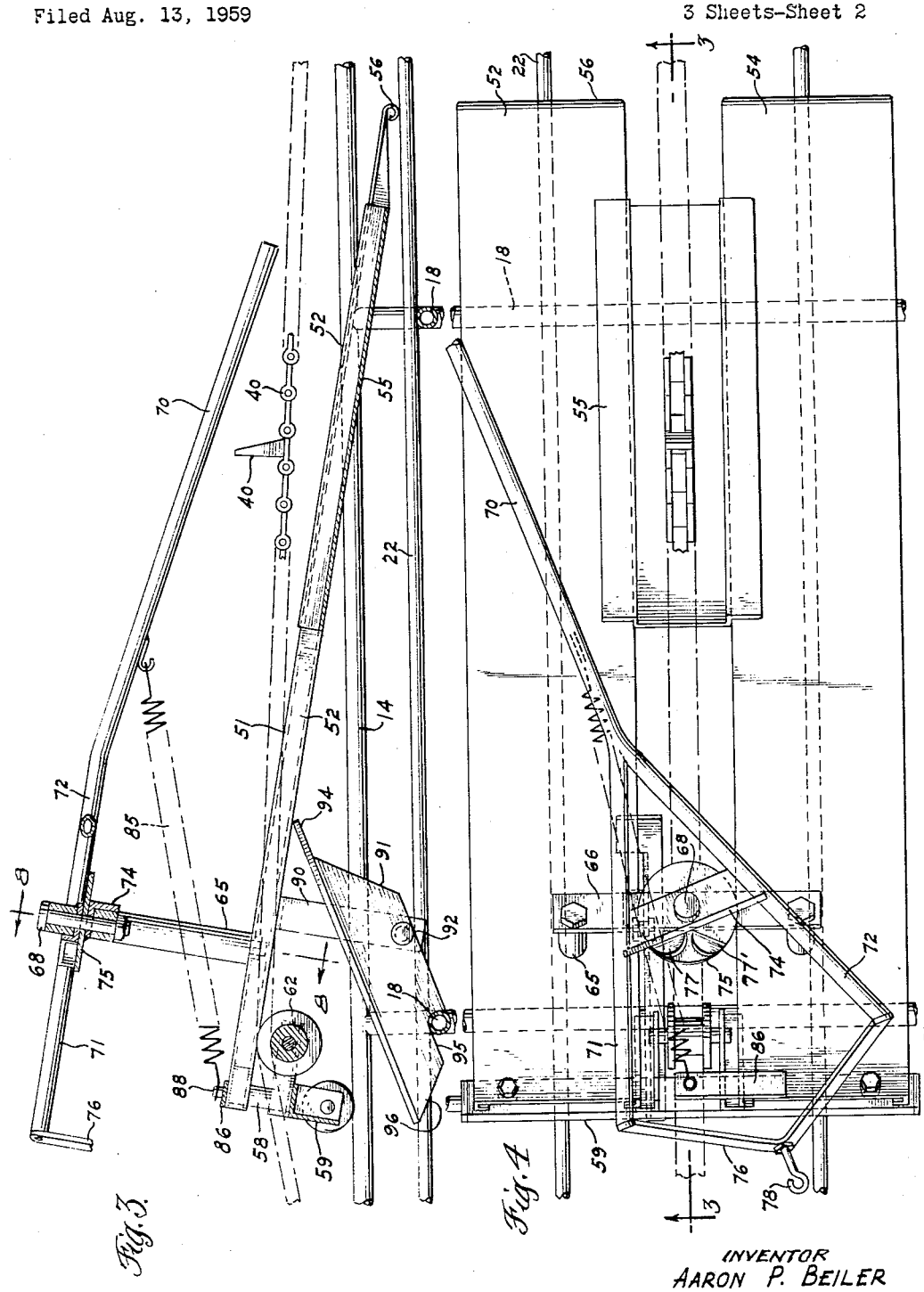

Sept. 26, 1961 A. P. BEILER 3,001,635
CONVEYOR
Filed Aug. 13, 1959 3 Sheets-Sheet 3
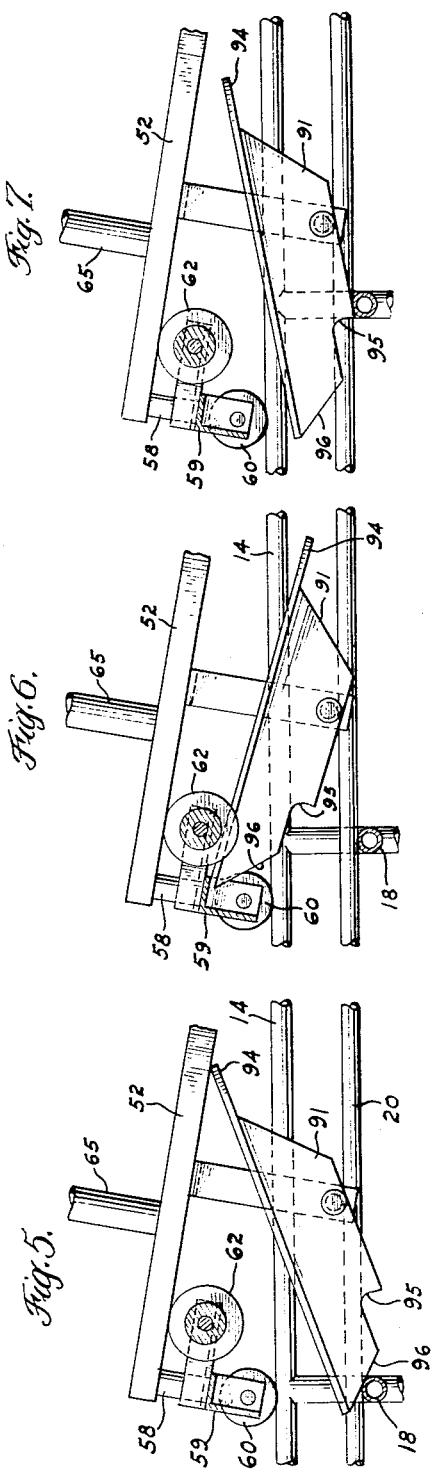
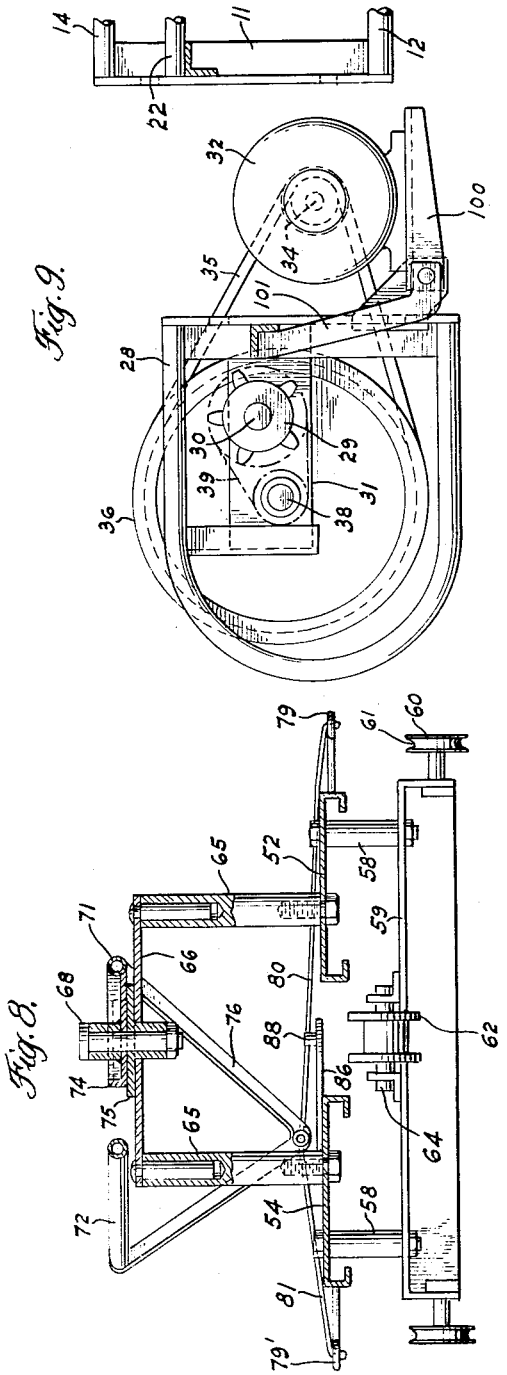
INVENTOR
AARON P. BEILER
By Joseph Allen Brown
ATTORNEY 3,001,635
CONVEYOR
Aaron P. Beiler, Gap, Pa., assignor to Sperry Rand Corporation, New Holland, Pa., a corporation of Delaware
Filed Aug. 13, 1959, Ser. No. 833,604
9 Claims. (Cl. 198—188)

The present invention relates generally to conveying apparatus and more particularly to a device for conveying hay bales and discharging them at any desired location along a generally horizontally extending endless conveyor.

Heretofore, conveyors have been provided for delivering bales to a hay mow and evenly distributing them. It is known to support a horizontal conveyor inside a barn adjacent the peak of the roof to convey bales deposited thereon from an elevator from one end of the barn toward the opposite end thereof. Conventionally, a device is provided along the conveyor to deflect each bale as it moves toward the rear end of the conveyor and to cause the bale to be discharged laterally. Usually, the means for deflecting the bales is shiftable so that the bales can be discharged to one side or the other of the conveyor. Also, the deflecting means is adjustable along the conveyor to vary the point of discharge to enable the operator to secure a good distribution of bales on the floor of the mow.

One object of this invention is to provide an improved conveyor of the type described which positively guides bales as they are conveyed to the discharge location.

Another object of this invention is to provide discharge means which may be more quickly and easily positioned at a desired point along the conveyor, to determine the point at which the bales will be discharged, than devices provided heretofore.

Another object of this invention is to provide improved and simplified latch means for positively locking the discharge means at a given position along the endless conveyor.

A further object of this invention is to provide discharge means which receives successive bales as they move along an endless conveyor to secure their discharge, such means including a ramp which lifts the bales from between a guide structure and having mounted thereon means for deflecting the bales once they have been so lifted.

A still further object of this invention is to provide conveying apparatus of the character described which includes discharge means having simple rope control means whereby an operator can selectively position discharge means along a conveyor at a desired, selected position.

Other objects of this invention will be apparent hereinafter from the specification and from the recital in the appended claims.

In the drawings:

FIG. 1 is a fragmentary side elevation of conveying apparatus constructed according to this invention;

FIG. 2 is a plan view of FIG. 1;

FIG. 3 is an enlarged section through the discharge means of the apparatus taken on the line 3—3 of FIG. 4 looking in the direction of the arrows;

FIG. 4 is a plan view of FIG. 3;

FIGS. 5, 6 and 7 are views showing the operation of the latch control means provided;

FIG. 8 is a section taken on the line 8—8 of FIG. 3 looking in the direction of the arrows; and FIG. 9 is an enlarged view of the rear end of the conveying apparatus showing the section which carries the drive motor separated from the remainder of the apparatus.

Referring now to the drawings by numerals of reference, the conveying apparatus comprises a frame structure 10 having longitudinally spaced, vertically extending brackets 11 interconnected by lower bars 12 and upper guide rails 14. The respective sides of the frame are interconnected by end cross members 16 and intermediate cross pipes 18. The cross pipes 18 constitute latch members, as hereafter described. Disposed between and extending parallel to guide rails 14, and spaced below the horizontal level of the rails, are rods 20 which provide support means over which bales, such as bale B (FIG. 2), can slide when conveyed.

Preferably, the conveyor is made up of sections which may be of any suitable length such as eight feet per section. A plurality of sections can be fastened together to provide a continuous conveyor structure of desired overall length. The forward end section 22 carries a suitable idler sprocket 24 journalled on pin 25 supported on brackets 26 fastened to and extending forwardly from section 22. The rear end section 28 carries a drive sprocket 29 keyed to a shaft 30 supported on brackets 31. Shaft 30 is adapted to be rotated by means of a motor 32 having an output shaft 34 operable through endless belts 35 to drive a pulley 36 connected to a shaft 38. Shaft 38 is connected to the shaft 30 and thus drive sprocket 29 through endless chain 39.

Extending around drive sprocket 29 and idler sprocket 24 is an endless conveyor chain 40 having an upper reach 41 and a lower reach 42. The chain has cleats or teeth 44 which project upwardly when moving along upper reach 41. When viewed as shown in FIG. 1, the endless chain 40 moves counterclockwise. When bales are placed on the forward section 22 of the conveyor they are engaged and moved by cleats 44 toward the rear section 28. As each bale is conveyed, it slides over the guide rods 20 and is confined against falling therefrom by the laterally disposed guide rails 14.

To secure the discharge of a bale at a desired point along the conveyor, a carriage 50 is provided comprising a ramp 51 having laterally spaced ramp sections 52 and 54 interconnected by a center plate 55. At their forward ends, the sections 52 and 54 of the ramp are provided with a bead 56 which rests on a guide rod 20. The upper rearward ends of the ramp are supported by posts 58 extending upwardly from an angle cross member 59 (FIG. 8). Cross member 59 carries a pair of rollers 60 which ride on the side rails 14. Each roller is grooved at 61 whereby the carriage is restrained from lateral shifting relative to the conveyor.

An idler wheel 62 is journalled on a pin 64 carried on member 59. Wheel 62 and ramp plate 55 provide a support for the upper reach 41 of endless chain 40 as it passes over the carriage 50. As shown in FIG. 1, the endless chain moves upwardly when it reaches carriage 50 and after it passes over the idler roller 61, it moved downwardly to the sprocket 29.

Connected to the ramp sections 52 and 54 are supports 65 interconnected by cross member 66 which carries a pivot pin 68. Mounted on the cross member 66 is a deflector arm 70 having legs 71 and 72 interconnected by an angle member 74 pivoted on the pin 68. A disc 75 having stops 77 and 77' is also supported on the member 66 to limit the lateral swinging movement of the deflector 70 from one side to the other. When member 74 is against stop 77, the deflector 70 is as shown in the solid line position of FIG. 2. When member 74 is against stop 77', the deflector is in the dotted line position 70' in FIG. 2.

The rearward ends of the legs 71 and 72 of deflector 70 are connected by a V-shaped member 76 which carries a hook 78 at its apex. The rearward ends of the ramp members 52 and 54 carry eyelets 79 and 79' (FIG. 2) which project laterally of the ramp. A first rope 80 extends from a rearward point along the conveyor forwardly through adjacent eyelet 79 and terminating at the hook 78 to which it is tied. A second rope 81 is also tied to the eyelet 78 and extends therefrom through the eyelet 79' and then forwardly and around a pulley 82 at the forward end of the conveyor. Then rope 81 extends rearwardly having a reach 84 adjacent the rearward end of the conveyor. When the rope 81 is pulled, the deflector 70 assumes the position shown in solid lines in FIG. 2. When the rope 80 is pulled, the deflector pivots about the pin 68 and assumes the position shown by the dotted line 70' in FIG. 2. An overcenter spring 85 is connected between the deflector and a bracket 86 (FIGS. 3 and 8) extending from the ramp section 54. A pin 88 to which the rearward end of spring 85 is connected is disposed midway of the conveyor. Thus, whether the deflector 70 is in a lefthand or a righthand position the spring 85 will be extended and will exert a holding effect upon the deflector.

Extending downwardly from the underside of ramp section 52 of ramp 51 is a bracket 90 having a latch element 91 pivotally connected to it at 92. The center of gravity of the latch element is to rearward side of the pivot 92 whereupon the member has a tendency to pivot in a counterclockwise direction from the position shown in FIG. 3. An extension 94 is provided on the element which engages the underside of the ramp section 52 to limit the pivoting of the latch element. The rearward or lower end of the latch element has a hook 95 spaced forwardly from a cam face 96 on the element. When it is in normal position, the latch element is disposed so that any movement of the carriage 50 toward the rearward end of the conveyor results in the cam face 96 engaging the latch members or cross pipes 18.

The mounting of the conveyor in a barn may be by means of straps extending downwardly from the underside of the barn roof and suitably connected to the conveyor sections. Preferably, the conveyor is disposed to extend parallel to the longitudinal center of the barn and be positioned close to the peak of the roof to provide a maximum space to receive the bales.

In operation, bales are adapted to be deposited on the forward section 22 of the conveyor. Conventionally, the bales are delivered from a suitable inclined elevator which conveys the bales from a wagon or the like. When each bale is deposited on rods 20 and between the rails 14 of the conveyor, it is engaged by a cleat 44 which causes the bale to be conveyed toward carriage 50. When the bale reaches the carriage, it slides up the ramp 51 and moves above the level of the side rails 14. Then, the bale engages the angularly extending deflector 70 which causes it to be discharged laterally of the conveyor. If the deflector arm is positioned as shown in solid lines in FIG. 2, the bale is discharged to the left when looking at the conveyor from the forward end rearwardly. If the deflector arm has been shifted to the dotted line position 70, each bale is discharged to the right of the conveyor.

To insure even distribution of the bales in the mow, the carriage 50 is adapted to be positioned or adjusted along the conveyor to a desired location. After a given number of bales have been discharged both right and left of any one location, the carriage is moved to another location whereupon subsequent bales are discharged. The operator loading bales into the mow may wish to discharge the bales adjacent the forward section 22 first and then progressively discharge the bales rearwardly along the conveyor as the filling operation takes place to achieve an even distribution on the mow floor. Another operator may wish to unload the bales adjacent the rearward end 28 first and then move the carriage forwardly to secure even distribution. To move the carriage from left to right in FIG. 1, all the operator has to do is pull on the rope 81 whereupon the carriage will slide along the guide rails 14 and the latch element 91 will skip over the latch members 18. When a suitable location is reached for discharging the bales, the rope 81 is released and the engagement of the next bale with the carriage will cause the carriage to be pushed rearwardly until the hook of latch element 91 engages the next latch member 18. Each section of the conveyor has two latch members 18. Therefore, the conveyor can be set in two locations for every conveyor section. If the conveyor is forty feet long and has five eight foot sections, carriage 50 can be latched in any one of ten different positions.

If the operator wishes to move the carriage 50 from a forward position rearwardly he uses the rope 80. As the carriage slides rearwardly on the side rails 14, the cam face 96 of the latch element 91 will engage a latch member 18 as shown in FIG. 5, and kick upwardly to the position shown in FIG. 6. If the carriage is moving with sufficient speed, when the latch element drops down again the hook 95 will have passed the adjacent latch member 18 (FIG. 7) and thus the carriage is able to move on to the next latching station. The operator continues to move the carriage with sufficient speed to cause the latch element to skip over the latch members until a desired location to stop the carriage is attained. Then the carriage is moved rearwardly at a slow speed whereupon the cam 96 merely slides up over the latch member 18 at that location and the hook 95 becomes engaged with the element. If the carriage is latched to a given latch element and it is desired to move the carriage further rearwardly, the carriage is first moved forwardly to release hook 95 from such latch member. Then the operator pulls on the rope 80 quickly to move the carriage rearwardly fast enough that the cam 96 will engage the latch member, pivot the latch element clockwise and upwardly so that when the element comes down, the hook 95 will have moved past the latch element.

As shown in FIG. 9, the motor 32 is carried on a support 100 extending rearwardly from bracket arms 101 on conveyor section 28. Section 28 can be removed from the adjacent conveyor section and motor 32 will be removed with it. Of course, the endless chain 40 has to be disconnected from drive sprocket 29. This end section 28 with motor 32 can be provided as a unit assembly, one being sold with each conveyor. Along with each end section will be provided a number of straight sections, there being as many sections as the purchaser desires to provide a given overall length of conveyor system. The forward section 22 is similar to the other sections of the conveyor except that the idler 24 is connected to it.

The structure described is relatively simple and the discharge of bales along any location of the conveyor is readily achieved by merely manipulating the ropes 80 and 81. The latch element 91 is adapted to be engaged with any of the latch members 18 whereupon the carriage can be locked in desired position.

The guide rails 14 in addition to providing side contact members for the bale to keep the bale on the conveyor also provide tracks over which the carriage can operate. Since the bale as it is conveyed is supported only upon the guide rods 20, there is very little frictional resistance to its conveyance. Thus, power usage is kept at a minimum. The ramp 51 elevates each bale and removes it from the side rails 14 whereupon the deflector member 70 can cause the bale to be discharged as desired.

While this invention has been described in connection with a particular embodiment thereof, it will be understood that it is capable of further modifications, and this application is intended to cover any variations, uses or adaptations of the invention following, in general, the principles of the invention and including such departures as come within known or customary practice in the art to which the invention pertains and as fall within the scope of the invention or the limits of the appended claims.

Having thus described my invention, what I claim is:

1. Bale conveying apparatus comprising a generally horizontally extending frame having a forward end and a rear end, a conveying means supported on said frame and operable to move bales toward said frame rear end, a carriage mounted on said frame and adjustable longitudinally relative thereto, side rails on said frame to guide each bale as it is conveyed, a ramp on said carriage for elevating each bale when it reaches said carriage relative to said side rails, a swingable deflector on said carriage and overlying said ramp for engagement by each bale as it moves up the ramp to effect discharge of the bale laterally of the conveyor, means pivotally supporting said deflector for placement, selectively, in one of two positions to discharge bales to either side of said conveyor, means for swinging said deflector from one position to the other position, and a resilient member holding said deflector in one and the other of said two positions.

2. Bale conveying apparatus as recited in claim 1 wherein said resilient member comprises an overcenter spring connected between said carriage and deflector.

3. Bale conveying apparatus as recited in claim 1 wherein said carriage has rollers which ride on said side rails whereby the carriage may be freely moved relative to said conveyor.

4. Bale conveying apparatus as recited in claim 1 wherein said means for swinging said deflector comprises one rope provided to swing said deflector ot said one position and move said carriage toward said forward end of said frame, and a second rope provided to swing the deflector to said other position and to move said carriage toward said rear end of said frame.

5. Bale conveying apparatus as recited in claim 1 wherein means is provided for latching said carriage to said frame in adjusted position against movement toward said rear end of frame while at the same time permitting free movement of the carriage toward said forward end of said frame.

6. Bale conveying apparatus as recited in claim 1 wherein said carriage carries a latch element and said frame has a plurality of longitudinally spaced latch members cooperative selectively with said latch element to lock said carriage against rearward movement at spaced locations along said conveyor, said latch element having a hook engageable with said latch members.

7. Bale conveying apparatus as recited in claim 6 wherein said latch element is supported on said carriage for pivotal movement about an axis transverse to said conveyor and said latch members comprise cross rods extending parallel to said axis.

8. Bale conveying apparatus comprising a generally horizontally extending frame having a forward end and a rear end, conveying means supported on said frame and operable to move bales toward said frame rear end, a carriage mounted on said frame and adjustable longitudinally relative thereto, a deflector on said carriage for engagement by each bale whereby the bale will be deflected laterally and discharged from the conveyor, a latch element carried on said carriage, a plurality of longitudinally spaced latch members carried on said frame, said latch members extending transversely relative to the extension of said conveyor, means supporting said latch element for pivotal movement about an axis transverse to said conveyor and parallel to the extension of said latch members, stop means limiting pivotal movement of said latch element in one direction and which disposes the latch element in a normal position, said latch element having a cam portion and a hook, said cam portion being disposed rearwardly of said hook for engagement with said latch members when said carriage is moved rearwardly on said conveyor, said cam when striking a given latch member upon movement of said carriage rearwardly pivoting said latch element in a direction opposite to said one direction, said latch element thereafter returning to its normal position wherein said hook may engage such latch member, said latch element being adapted to be moved past a given latch member by moving said carriage with such speed that when the latch element is pivoted upon engagement of said cam portion with a latch member, it moves past such latch member before it returns to normal position thereby preventing engagement of said hook, and means for moving said carriage.

9. Bale conveying apparatus comprising a generally horizontally extending frame having a forward end and a rear end, a conveying means supported on said frame and operable to move bales toward said frame rear end, a carriage mounted on said frame and adjustable longitudinally relative thereto, side rails on said frame to guide each bale as it is conveyed, a ramp on said carriage for elevating each bale when it reaches said carriage relative to said side rails, a swingable deflector on said carriage for engagement by each bale as it moves up the ramp and after it has been elevated to effect discharge of the bale laterally of the conveyor, means pivotally supporting said deflector for placement, selectively, in one of two positions to discharge bales to either side of said conveyor, a resilient member holding said deflector in one and the other of said two positions, a latch element on said carriage and supported for pivotal movement about an axis transverse to said conveyor, a plurality of longitudinally spaced latch members comprising cross rods extending transverse to said conveyor and cooperative selectively with said latch element to lock said carriage against rearward movement at spaced locations along said conveyor, said latch element having a hook engageable with said latch members, stop means limiting pivotal movement of said latch element in one direction and disposing the latch element in a normal position, a cam portion on said latch element in front of said hook toward said rear end of said frame for engagement with said latch members when said carriage is moved rearwardly, said cam when engaging a given latch member pivoting said latch element in a direction opposite to said one direction, said latch element thereafter returning to its normal position wherein said hook may engage such latch member, said latch element being adapted to be moved past a given latch member by moving said carriage rearwardly with such speed that when the latch element is pivoted, it moves past the adjacent latch member before it returns to normal position thereby preventing engagement of said hook, and means for moving said carriage.

References Cited in the file of this patent

UNITED STATES PATENTS

| | | |
|---|---|---|
| 1,762,074 | Paisley | June 3, 1930 |
| 2,099,071 | Lundbye | Nov. 16, 1937 |
| 2,219,827 | Kimball et al. | Oct. 29, 1940 |
| 2,785,788 | Mathews | Mar. 19, 1957 |

FOREIGN PATENTS

| | | |
|---|---|---|
| 517,237 | France | Dec. 16, 1920 |